United States Patent
Schuett et al.

(10) Patent No.: US 7,378,665 B2
(45) Date of Patent: May 27, 2008

(54) METHODS AND DEVICES FOR VERIFYING THE AUTHENTICITY OF SHEET-TYPE PRODUCTS

(75) Inventors: Lothar Schuett, Dachau (DE); Hans-Uwe Richter, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 92 days.

(21) Appl. No.: 10/497,962

(22) PCT Filed: Dec. 9, 2002

(86) PCT No.: PCT/EP02/13941

§ 371 (c)(1), (2), (4) Date: Mar. 10, 2005

(87) PCT Pub. No.: WO03/054809

PCT Pub. Date: Jul. 3, 2003

(65) Prior Publication Data

US 2005/0156116 A1    Jul. 21, 2005

(30) Foreign Application Priority Data

Dec. 10, 2001    (DE) ................................ 101 60 578

(51) Int. Cl.
*G01J 1/42*    (2006.01)
(52) U.S. Cl. ...................... 250/372; 209/534
(58) Field of Classification Search ................ 250/372; 209/534
See application file for complete search history.

(56) References Cited

U.S. PATENT DOCUMENTS

| | | | |
|---|---|---|---|
| 5,280,333 A | 1/1994 | Wunderer | |
| 5,476,169 A * | 12/1995 | Takarada et al. | 194/207 |
| 5,640,463 A | 6/1997 | Csulits | |
| 5,960,103 A | 9/1999 | Graves et al. | |
| 6,061,121 A | 5/2000 | Holl et al. | |
| 6,472,670 B1 | 10/2002 | Philipp et al. | |
| 2001/0006556 A1 | 7/2001 | Graves et al. | |
| 2002/0109830 A1* | 8/2002 | Liu | 356/71 |
| 2003/0039359 A1 | 2/2003 | Thierauf | |
| 2004/0056084 A1* | 3/2004 | Skinner | 235/379 |

FOREIGN PATENT DOCUMENTS

| | | |
|---|---|---|
| DE | 24 40 552 | 1/1976 |
| DE | 195 17 194 A1 | 11/1996 |
| DE | 199 01 702 A | 7/2000 |
| EP | 0 668 576 A | 8/1995 |
| EP | 1 120 753 A2 | 8/2001 |
| FR | 2 801 125 A | 5/2001 |
| GB | 1 470 737 | 4/1977 |
| GB | 2 355 522 A | 4/2001 |
| JP | 5624685 A | 3/1981 |
| RU | 2097832 C1 | 11/1997 |
| RU | 2139571 C1 | 10/1999 |
| RU | 2169393 C2 | 6/2001 |
| SU | 1753252 A1 | 8/1992 |
| WO | WO 00/42578 A1 | 7/2000 |
| WO | WO 01/41079 A1 | 6/2001 |

* cited by examiner

*Primary Examiner*—Christine Sung
(74) *Attorney, Agent, or Firm*—Rothwell, Figg, Ernst & Manbeck P.C.

(57) ABSTRACT

Ultraviolet light is used for checking the authenticity of sheet material, in particular bank notes, whereby the ultraviolet light transmitted, i.e. pervading the sheet material to be checked, is used for checking authenticity.

19 Claims, 1 Drawing Sheet

METHODS AND DEVICES FOR VERIFYING THE AUTHENTICITY OF SHEET-TYPE PRODUCTS

CROSS-REFERENCE TO RELATED APPLICATIONS

This application is a National Phase of International Application No. PCT/EP02/13941, filed Dec. 9, 2002.

FIELD OF THE INVENTION

The present invention relates to methods and apparatuses for checking the authenticity of sheet material, in particular bank notes, by means of ultraviolet light.

DESCRIPTION OF THE BACKGROUND ART

Methods and apparatuses for checking the authenticity of sheet material, in particular bank notes, by means of ultraviolet light are known from U.S. Pat. No. 5,640,463 or U.S. Pat. No. 5,960,103, for example. Known methods and apparatuses are based on the finding that the paper used for bank notes has special properties because it is produced from cotton, on the one hand, and contains no optical brighteners, on the other hand. Upon irradiation with ultraviolet light there is thus no fluorescence effect, i.e. short-wave, ultraviolet light is not converted to longer-wave, visible light. Moreover, a relatively great portion of ultraviolet light is reflected by the surface of the bank note to be evaluated. Forgeries can therefore be recognized if they are irradiated with ultraviolet light for evaluation and the optical brighteners thereby result in longer-wave, visible light. With certain forgeries it has turned out, however, that there is no conversion of short-wave, ultraviolet light to longer-wave, visible light. In these cases a forgery can be recognized, however, when the ultraviolet light reflected by the forgery is examined. If the amount of reflected ultraviolet light should fall below a first, lower threshold value or exceed a second, upper threshold value, a forgery is likewise present, since the amount of reflected ultraviolet light is normally only within a certain range with authentic bank notes.

Known methods and apparatuses for checking the authenticity of sheet material, in particular bank notes, by means of ultraviolet light have the disadvantage, however, that forgeries cannot be recognized if they have no fluorescence effect and the evaluation of the amount of reflected ultraviolet light also fails to yield a clear statement.

SUMMARY OF THE INVENTION

The problem of the present invention is therefore to specify methods and apparatuses for checking the authenticity of sheet material, in particular bank notes, by means of ultraviolet light which permit a more reliable distinction between forgeries and authentic bank notes.

In a first consideration, the invention starts out from the use of ultraviolet light for checking the authenticity of sheet material, in particular bank notes, whereby the ultraviolet light transmitted, i.e. permeating the sheet material to be checked, is used for checking authenticity.

The advantage of the invention is in particular to be seen in the fact that, departing from methods and apparatuses known from the prior art, not only the surface of the sheet material to be checked which is exposed to the ultraviolet light used for the check, but rather the total material, i.e. the total thickness, of the sheet material to be examined interacts with the ultraviolet light. The effects on the ultraviolet light used for the check are therefore considerably more pronounced, so that the check of the ultraviolet light transmitted by the sheet material permits forgeries to be recognized even in cases which were hitherto not distinguishable from authentic sheet material, since the differences in the quantities of transmitted ultraviolet light are considerably more pronounced between forgeries and authentic sheet material.

In a second consideration, the invention likewise starts out from the use of ultraviolet light for checking the authenticity of sheet material, in particular bank notes, whereby the ultraviolet light transmitted, i.e. permeating the sheet material to be checked, is used for checking authenticity. In addition to the ultraviolet light, however, at least one further light of a different wavelength is used, whereby the further light transmitted, i.e. permeating the sheet material to be checked, is likewise used for checking authenticity, for which purpose the transmitted ultraviolet light and the transmitted further light are set in a mutual relation.

The advantage of the invention according to the second consideration is in particular to be seen in the fact that, departing from methods and apparatuses known from the prior art, the check can be done almost independently of any soiling of the sheet material to be examined, since the effects arising from soiling on the light passing through the sheet material are the same or have a defined relation for both the ultraviolet light and the further light. When the transmitted ultraviolet light and the transmitted further light are set in a mutual relation, the effects due to soiling cancel out.

BRIEF DESCRIPTION OF THE DRAWINGS

Further advantages of the present invention will result from the dependent claims as well as the following description of embodiments with reference to figures, in which:

DETAILED DESCRIPTION OF THE INVENTION

Figure 1:
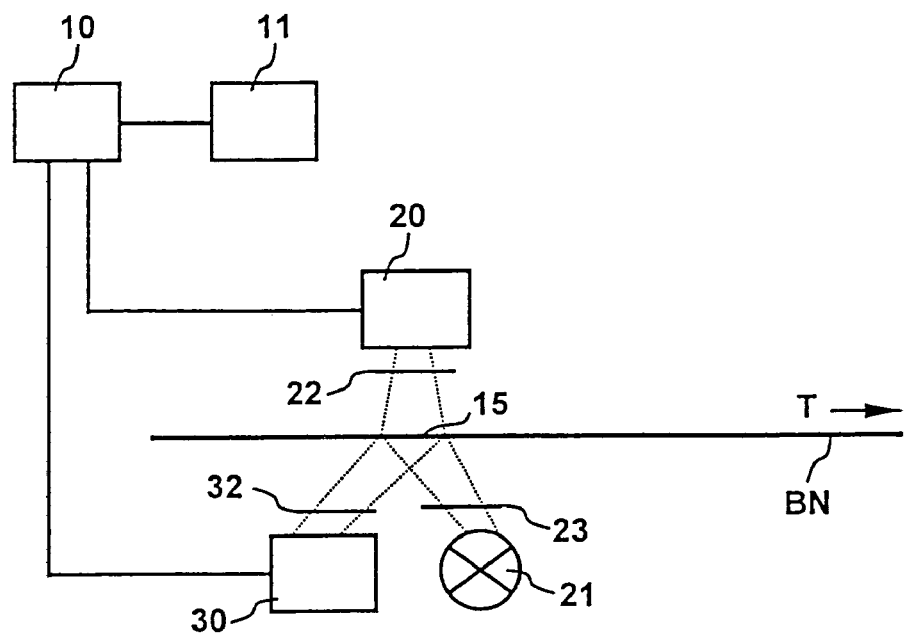
FIG. 1 shows a first embodiment of an apparatus for checking the authenticity of sheet material by means of ultraviolet light.

FIG. 1 shows a first embodiment of an apparatus for checking the authenticity of sheet material, in particular bank notes, by means of ultraviolet light. In the following description it will be assumed that the sheet material is bank notes. The bank notes BN are transported by a transport system (not shown) in a transport direction T past a sensor 20 and a light source 21. It is possible that the bank notes BN are transported along their long side or along their short side. The light source 21 produces light which is suitable for checking the authenticity of the bank notes BN and is in the ultraviolet range, i.e. has a wavelength below 400 nm. The light source 21 can produce the ultraviolet light directly, or a filter 23 passing only ultraviolet light can be provided. The ultraviolet light permeates the bank note BN at a place 15 which sweeps over the total length or width (depending on the selected type of transport) of the bank note BN during transport of the bank note BN in the transport direction T. The transmitted ultraviolet light is detected by the sensor 20. The sensor 20 can be sensitive only to the ultraviolet light produced by the light source 21, or a filter 22 only passing corresponding ultraviolet light to the sensor 20 can be provided. The light source 21 used can be for example one or more UV light-emitting diodes. It is equally possible to use for example one or more fluorescent tubes producing ultraviolet light. At the place of the filters 22 and 23, further optical systems such as lenses can be provided in addition to or instead of the filters 22 and 23 to obtain for example a special focusing at the place 15 or at the sensor 20.

To check the authenticity of the bank notes BN, the light source 21 emits ultraviolet light with a wavelength under 400 nm. Since during transmission of the ultraviolet light through the bank note BN most of the ultraviolet light is absorbed in the material of the bank note BN, there was hitherto no attempt to use the measurement of the ultraviolet light transmitted by the bank note BN as a criterion for checking the authenticity of the bank note BN. It was noticed, however, that—precisely because of the great influence on the ultraviolet light when passing through the bank note BN, i.e. because of the great absorption that occurs—the evaluation of the transmitted ultraviolet light has particularly good informative power about the material of the particular bank note BN checked and thus about its authenticity.

Despite the small quantity of ultraviolet light available after transmission on the side of the sensor 21, better distinction between authentic bank notes BN and forgeries is possible since the relative differences between authentic bank notes BN and forgeries are very great.

Forgeries made of normal paper without an optical brightener, i.e. paper produced from wood, have the best permeability to ultraviolet light. If the forgeries consist of paper produced from cotton like authentic bank notes, the forgeries have poor permeability to ultraviolet light, since such paper as a rule contains added substances which absorb the ultraviolet light to imitate the lack of brightener known in authentic bank notes.

Therefore, bank notes BN can be distinguished reliably from forgeries if the quantity of transmitted ultraviolet light detected by the sensor 20 is above a lower threshold value and below an upper threshold value. If the sensor 20 detects a quantity of ultraviolet light which is above the upper threshold value, a forgery made of normal paper (wood) is present, while if the quantity of ultraviolet light detected by the sensor 20 is below the lower threshold value, a forgery made of bank note paper (cotton) is present.

Since the effect on the ultraviolet light is particularly great in case of transmission, as described above, forgeries can be reliably distinguished from authentic bank notes since the threshold values used are very far apart. The described effects occur for bank notes from all currencies examined hitherto; any deviations can be compensated by a suitable choice of threshold values.

For evaluating the quantities of transmitted ultraviolet light determined by the sensor 20, an evaluation unit 10 with a connected memory 11 is provided. The evaluation unit 10 can be formed for example by a microprocessor with a connected memory 11, whereby the memory 11 can have a volatile and a nonvolatile area. The nonvolatile area of the memory 11 stores in particular the above-mentioned threshold values. To permit the measurements from the sensor 20 to be processed by the evaluation unit 10, an analog/digital converter is provided for example in the sensor 20 for converting the analog output signal of the sensor 20 to a digital value.

The evaluation unit 10 compares the values from the sensor 20 with the threshold values, thereby checking the authenticity of the bank note BN. Depending on the result of the check, the evaluation unit 10 identifies the bank note BN as authentic or as a forgery. This identification can be used for the further processing of the bank note BN, e.g. to control the above-mentioned transport system, thereby making it possible to separate forgeries from authentic bank notes. For this purpose the forgeries are transported to a special output pocket, for example.

For evaluation of the values of the sensor 20 by the evaluation unit 10 there are different procedures that can be used. For example, an average can be produced by the evaluation unit 10 from all the values produced while the bank note BN is transported past the sensor 20, and said average compared with the threshold values. It is equally possible to determine at least one pattern for the bank notes to be checked and to store it in the memory 11. In this case the values produced while the bank note BN is transported past the sensor 20 are checked for agreement with the pattern to determine the authenticity of the bank note BN. A further possibility is to examine only certain areas of the bank note BN, e.g. areas without printing, and to compare them with threshold values.

A further improvement in authenticity testing can be obtained if a further sensor 30 which can detect light in the visible range, i.e. with a wavelength greater than 400 nm, is provided on the side of the light source 21. If the sensor 30 should also be able to detect light with a smaller wavelength, a filter 32 not permeable to these light components can be provided. If a forgery containing an optical brightener is present, the ultraviolet light of the light source 21 is converted by a fluorescence effect to visible light which is detected by the sensor 30. To permit the signal of the sensor 30 to be processed by the evaluation unit 10, the sensor 30 contains an analog/digital converter which converts the sensor signal to a digital value. If the digital value exceeds a predetermined threshold value for brightener measurement which is stored in the memory 11, a forgery is recognized by the evaluation unit 10.

Figure 2:
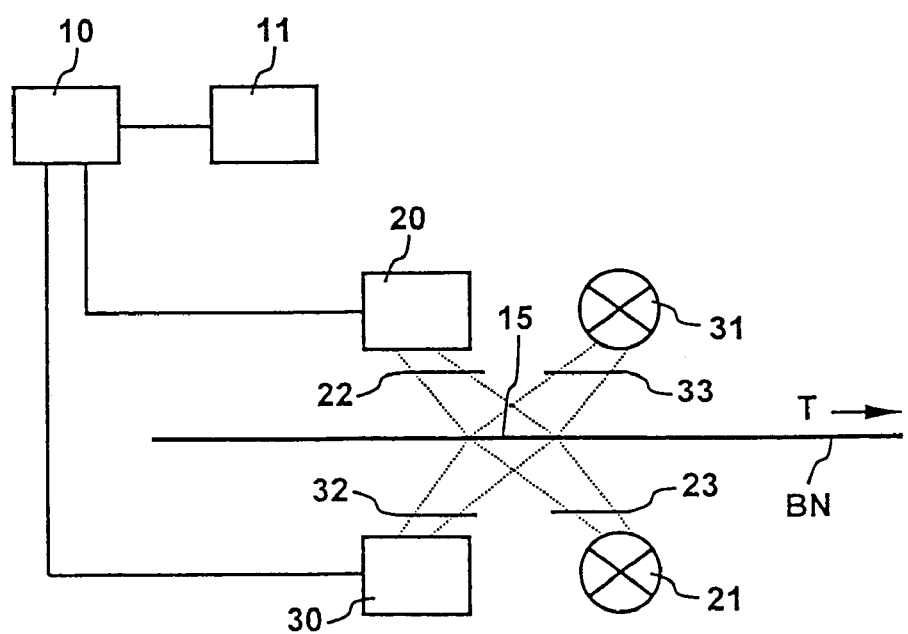
FIG. 2 shows a second embodiment of an apparatus for checking the authenticity of sheet material by means of ultraviolet light.

FIG. 2 shows a second embodiment of an apparatus for checking the authenticity of sheet material, in particular bank notes, by means of ultraviolet light. The second embodiment according to FIG. 2 is built up essentially like the first embodiment according to FIG. 1. The function of the apparatus according to the second embodiment likewise corresponds essentially to the function of the apparatus according to the first embodiment. However, the apparatus additionally has on the side of the sensor 20 for ultraviolet light a second light source 31 which produces light in a visible range, i.e. with a wavelength greater than 400 nm. Should the second light source 31 have shorter-wave components, a filter 33 can be provided which does not pass them.

As described above in connection with FIG. 1, the first light source 21 and the first sensor 20 serve the purpose of checking the authenticity of bank notes by means of transmitted, ultraviolet light. The second sensor 30 which detects light in the visible range and is disposed on the side of the first light source 21 producing ultraviolet light serves the purpose—as described—of detecting the presence of optical brighteners.

Additionally the second sensor 30 is used for detecting the transmitted light of the second light source 31 for visible light. If a forgery with optical brightener contained in the paper is present, the fluorescence effect produces a relatively large amount of visible light so that the above-described threshold value for brightener measurement is exceeded. If the fluorescence effect does not occur, only a considerably smaller amount of visible light is present which is below the threshold value for brightener measurement. This light is from the second light source 31 and was transmitted by the bank note BN. From the second sensor 30 the corresponding values which are digitized by an analog/digital converter are passed to the evaluation unit 10 and set by the evaluation unit 10 in a relation with the values of the first sensor 20, e.g. by division of the values of the first sensor 20 by the values of the second sensor 30. Before the division of the values or instead of the division, a special correction of another mathematical relation can also be effected, which results from the same kind of influence on the visible light and the ultraviolet light.

This procedure permits compensation of any soiling of the bank notes BN to be checked, since the above-described effects on the light upon transmission by the bank note are not changed by soiling. Soiling instead causes a reduction of the transmitted light quantity, both for the light of the first light source 21 and for the light of the second light source 31. The soiling of bank notes can therefore be compensated if the values of the first sensor 20 are set in a relation with the values of the second sensor 30, as described. Suitable threshold values or patterns must in this case of course be provided for the check and stored in the memory 11. The threshold values are obtained by means of authentic bank notes by setting values of the first sensor 20 in a relation with values of the second sensor 30.

Since the soiling of the bank notes can have strong local fluctuations, it has proved especially expedient that first and second sensors 20 and 30 evaluate the bank note BN at the same place 15.

Ideally, the wavelength of the second light source 31 is chosen—as described—so that the second sensor 30 already present for detecting optical brighteners can be used for detecting the transmitted light, for example in such a way that the light is in the blue range. It is equally possible to choose another wavelength to compensate soiling effects, however. In particular, the wavelength of the second light source 31 and the second sensor 30 can also be smaller than the wavelength of the first light source 21 and the first sensor 20. In this case, however, a further sensor (not shown) must be provided on the side of the first light source 21 to permit a check of the presence of optical brighteners.

To compensate effects like aging, soiling or temperature fluctuations which affect the sensors 20, 30 or the light sources 21, 31, it can be provided that a calibration is carried out in the gaps between bank notes BN to be checked. Reference values stored in the memory 11 are thus compared by the evaluation unit 10 with the values of the sensors 20, 30. If deviations appear, the evaluation unit 10 can readjust the light sources 21, 31 for example. Calibration can also be carried out by means of separate monitor receivers (not shown), i.e. sensors receiving the light of the light sources 21, 31. If the monitor receivers detect deviations, readjustment is effected.

Besides the described embodiments, diverse variations are conceivable. In particular, the arrangement of the sensors and/or light sources can be changed.

Likewise, further optical systems such as lenses can be provided at the place of the filters 22, 23, 32 and 33 in addition to or instead of the filters 22, 23, 32 and 33, for example to obtain a special focusing at the place 15 or the sensors.

Further changes result from the use of several sensors 20, 30 and associated light sources 21, 31 to permit measurements to be carried out in several tracks. One can also provide so many adjacent or overlapping tracks here to permit an all-over check of the bank note.

A further variation is possible if the light sources 21 or 31 emit not only light below or above 400 nm, but light of a limited spectral range. The first light source 21 can e.g. emit light in a range of 350-400 nm, while the further light source 31 emits light in a range of 400-450 nm. In this case the sensors 20 or 30 and/or the filters 22, 23, 32, 33 can be adapted accordingly.

In a further preferred embodiment of the inventive apparatus, a lock-in amplifier is provided for amplifying output signals, before the analog/digital conversion thereof, at least one of the sensors 20, 30. Lock-in amplifiers are used in the measurement and processing of very weak analog signals, whereby the signal background is suppressed very strongly. With a lock-in amplifier the modulated output signal of a sensor is amplified and demodulated in a synchronous detector with a normalized reference signal of the same modulating frequency. In a lowpass the high-frequency components are then filtered out. The result obtained is a signal which is proportional to the amplitude of the amplified emitted fluorescent light (sensor 30) or the reflected ultraviolet light (sensor 20). Since the use of a lock-in amplifier is suitable in particular for amplifying very weak analog signals, it can measure very weak light with high precision. This is of advantage particularly when the intensity of the light source diminishes in the course of its service life and consequently the fluorescent light excited in the bank note to be checked or the ultraviolet light transmitted becomes weaker.

The present invention is especially suitable for bank note processing machines, e.g. for sorting and/or counting machines and/or money accepting machines.

The invention claimed is:

1. A method for checking the authenticity of sheet material, in particular bank notes, by means of ultraviolet light, comprising:
   illuminating the sheet material with ultraviolet light;
   evaluating the ultraviolet light transmitted by the sheet material to check the authenticity of the sheet material; and
   identifying the sheet as authentic or as a forgery based solely on the transmitted ultraviolet light.

2. A method according to claim 1, wherein at least one threshold value or at least one pattern for the transmitted ultraviolet light is derived from at least one authentic piece of sheet material for checking the authenticity of the sheet material.

3. A method according to claim 1, wherein it is checked whether the ultraviolet light is converted by the sheet material to light of another wavelength.

4. A method for checking the authenticity of sheet material, in particular bank notes, by means of ultraviolet light, comprising:
   illuminating the sheet material with ultraviolet light and a second light with a wavelength different from the ultraviolet light;
   setting the ultraviolet light transmitted by the sheet material and the second light transmitted by the sheet material in a mutual relation;
   evaluating the relation to check the authenticity of the sheet material; and
   identifying the sheet as authentic or as a forgery based solely on the transmitted ultraviolet light.

5. A method according to claim 4, wherein at least one threshold value or at least one pattern for the relation is derived from at least one authentic piece of sheet material for checking the authenticity of the sheet material.

6. A method according to claim 4, wherein the transmitted ultraviolet light and the transmitted second light come from the same place on the sheet material to be checked.

7. A method according to claim 4, wherein the transmitted ultraviolet light and the transmitted second light are evaluated at the same time.

8. A method according to claim 4, wherein it is checked whether the ultraviolet light is converted by the sheet material to light of another wavelength.

9. An apparatus for checking the authenticity of sheet material, in particular bank notes, by means of ultraviolet light, having a light source for producing the ultraviolet light, whereby the light source illuminates the sheet material with ultraviolet light, and a sensor which produces values for ultraviolet light transmitted by the sheet material, and an evaluation unit for checking the authenticity of the sheet material solely on the basis of the values of the sensor.

10. An apparatus according to claim 9, wherein several sensors and/or light sources are present for detecting several tracks of the sheet material.

11. An apparatus according to claim 10, wherein the sensors detect the surface of the sheet material completely.

12. An apparatus according to claim 9, wherein a memory is connected to the evaluation unit and contains at least one threshold value or at least one pattern which are derived from at least one authentic piece of sheet material for checking the authenticity of the sheet material, and are compared by the evaluation unit with the values or the sensor.

13. An apparatus according to claim 9, wherein a lock-in amplifier amplifies the signal of at least one of the first sensor or sensors and the further sensor.

14. An apparatus for checking the authenticity of sheet material, in particular bank notes, by means of ultraviolet light, having a first light source for producing the ultraviolet light, whereby the light source illuminates the sheet material with ultraviolet light, and a first sensor which produces values for light of the first light source transmitted by the sheet material, a second light source for producing ultraviolet light with a smaller wavelength than the ultraviolet light of the first light source, and a second sensor which produces values for light of the second light source transmitted by the sheet material, and an evaluation unit for checking the authenticity of the sheet material solely on the basis of a relation of the values of the first sensor to the values of the second sensor.

15. An apparatus according to claim 14, wherein the sensors detect the same place on the sheet material.

16. An apparatus according to claim 14, wherein the sensors detect the sheet material at the same time.

17. An apparatus according to claim 14, wherein several sensors and/or light sources are present for detecting several tracks of the sheet material.

18. An apparatus according to claim 17, wherein the sensors detect the surface of the sheet material completely.

19. An apparatus according to claim 14, wherein a memory is connected to the evaluation unit and contains at least one threshold value or at least one pattern which are derived from at least one authentic piece of sheet material for checking the authenticity of the sheet material, and are compared by the evaluation unit with the relation of the values of the sensor or sensors to the values of the second sensor or sensors.

* * * * *